(12) United States Patent
Larsson

(10) Patent No.: US 7,724,640 B2
(45) Date of Patent: May 25, 2010

(54) METHOD AND ARRANGEMENT FOR ARQ DATA TRANSMISSION

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 524 days.

(21) Appl. No.: 10/584,859

(22) PCT Filed: Dec. 23, 2004

(86) PCT No.: PCT/EP2004/014670
§ 371 (c)(1),
(2), (4) Date: Jun. 4, 2007

(87) PCT Pub. No.: WO2005/064837
PCT Pub. Date: Jul. 14, 2005

(65) Prior Publication Data
US 2007/0297325 A1    Dec. 27, 2007

(30) Foreign Application Priority Data

Dec. 29, 2003 (SE) .................... 0303590
Jun. 29, 2004 (EP) .................... 04015192

(51) Int. Cl.
H04L 1/14 (2006.01)
H04L 1/12 (2006.01)
G06F 11/00 (2006.01)
G08C 25/02 (2006.01)

(52) U.S. Cl. .................. 370/216; 370/229; 370/230; 370/235; 714/748; 714/749; 714/799

(58) Field of Classification Search .................. None
See application file for complete search history.

(56) References Cited

U.S. PATENT DOCUMENTS 6,101,168 A      8/2000  Chen et al.
2001/0055290 A1* 12/2001 Seidel et al. ............ 370/337
2004/0203419 A1* 10/2004 Crocker et al. .......... 455/67.11

FOREIGN PATENT DOCUMENTS

CN     1354572 A      6/2002
EP     1 168 703 A    1/2002
EP     1 182 797 A    2/2002
WO     WO02/09342 A2  1/2002

OTHER PUBLICATIONS

Translation of Chinese official action, Apr. 3, 2009. in corresponding Chinese Application No. 200480039324.0.
Translation of Chinese Official Action, Feb. 12, 2010, in corresponding Chinese Application No. 2004800393240.

* cited by examiner

Primary Examiner—Maria L Sekul
Assistant Examiner—Huy D Vu
(74) Attorney, Agent, or Firm—Nixon & Vanderhye P.C.

(57) ABSTRACT

A sender and a receiver are engaged in an automatic repeat request (ARQ) wireless communication with each other. The sender is provided with an incoming data stream of a plurality of protocol data units (PDUs). The sender transmits a plurality of PDUs which are at least partially overlapping, with at least two different transmission power levels being used for the transmission of at least two different PDUs.

9 Claims, 4 Drawing Sheets

METHOD AND ARRANGEMENT FOR ARQ DATA TRANSMISSION

This application is the US national phase of international application PCT/EP2004/014670, filed 23 Dec. 2004, which designated the U.S. and claims priority of SE 0303590-4, filed 29 Dec. 2003, and EP 04015192.0, filed 29 Jun. 2004, the entire contents of each of which are hereby incorporated by reference.

TECHNICAL FIELD

The technology described herein relates to automatic repeat request (ARQ) in data communication. In particular, the technology described herein relates to the use of ARQ over fluctuating radio channels.

BACKGROUND

In most communication system, not at least wireless communication systems, it is of highest importance to provide a reliable protocol for delivering data units from one entity to at least another entity in the system, without loss of data and without duplication of data. Such reliable data delivery protocols typically relies one the principle that the receiver of the data responds to the sender of the data with acknowledgements upon reception of the data and/or negative acknowledgements if the data units were lost. The sender will subsequently to the acknowledgement send the next data unit, or if a negative acknowledgement, retransmit the lost data unit.

Automatic repeat request (ARQ) is one of the most common retransmission techniques in communication networks, and ensures reliable user data transfer and data sequence integrity. The data is, prior to the transmission, divided into smaller packets, protocol data units (PDU). A reliable transfer is enabled by encoding packets with an error detecting code, such that the receiver can detect erroneous or lost packets and thereby order retransmission. The data sequence integrity is normally accomplished by sequential numbering of packets and applying certain transmission rules.

In the most simple form of ARQ, commonly referred to as Stop-and-Wait ARQ, the sender of data stores each sent data packet and waits for an acknowledgement from the receiver of a correctly received data packet, by the way of a acknowledgement message (ACK). When the ACK is received, the sender discard the stored packet and sends the next packet. An example of a prior art Stop-and-Wait ARQ scheme is schematically depicted in the message sequence chart of FIG. 1a. The process is typically supplemented with timers and the use of negative acknowledgement messages (NACK), which is illustrated in FIG. 1b. The sending entity uses a timer, which is started on the transmission of a data packet, and if no ACK has been received before the timer expires the data packet is retransmitted. If the receiver detects errors in the packet it can send a NACK to sender. Upon receiving the NACK the sender retransmit the data packet without waiting for the timer to expire. If the ACK or NACK message is lost, the timer will eventually expire and the sender will retransmit the data packet. From the simple Stop-and-Wait, more elaborated schemes of the conventional ARQ has been developed, for example Go-Back-N and Selective Reject (or Selective Repeat), which provides a higher throughput. Taught in WO 02/09342 by Dahlman et al. is a ARQ scheme that adds flexibility to the traditional ARQ scheme by introducing ARQ parameters that are set and/or negotiated to give a desired trade-off as regard to communication resources.

In another line of development of the ARQ, the redundancy in the coding is exploited in various ways to enhance communication performance (generally measure as throughput). These schemes are referred to as Hybrid ARQ schemes. Due to the combination of coding and ARQ, the hybrid ARQ schemes can give a certain adaptation to changes in the radio environment, e.g. to fading. How to best combine ARQ and coding schemes to cope with fading channels is not trivial. Several approaches and schemes have been suggested and used.

In Hybrid 1 ARQ Forward Error Correction (FEC) is combined with ARQ. In Hybrid 2 ARQ a PDU is sent more or less uncoded, but accompanied with a Cyclic Redundancy Check (CRC) for checking presence of bit errors after decoding. If CRC fails, i.e. errors are detected, then the PDU is requested for retransmission, and a codeword which is generated based on the data transmitted with the first PDU is sent. The codeword may have such character that the original dataword can be determined solely by decoding the codeword or it may be combined with the previously received PDUs content, and thereby improving the chance of decoding the data word without errors. The coding may for instance employ so-called half rate invertable codes. A version of Hybrid 2 ARQ is used in UMTS. Another Hybrid ARQ method is to combine a PDU that is transmitted multiple times by maximum ratio combining (or similar such as interference Rejection Combining). Disclosed in U.S. Pat. No. 6,308,294 by Ghosh et al. is a method of combining so called turbo codes with Hybrid ARQ, which allows retransmission of different sizes, and increased adaptability to fading channels.

As exemplified above advantages have been made in providing ARQ schemes that increases throughput and/or offer flexibility with regards to channel quality. However, the prior art methods suffers from drawbacks, mainly:

Conventional non-Hybrid ARQ schemes, but to some extent also Hybrid ARQ schemes, are inefficient when the channel quality changes unpredictable. Such changes may be caused by that the radio channel fluctuates due to fading, or that interference fluctuates unpredictable due to fading or/and due to unpredictable traffic fluctuations.

Further may the channel fluctuation cause inaccuracies in channel measurements and/or that outdated channel measurements are used for link mode selection. This may cause packets to be sent with a rate that is not decodable if the interference and noise is greater than permitted for the selected rate. Alternatively, a margin may be introduced and a reduced rate used, but this is done with the "cost" of not efficiently use the channels that can bear a higher rate.

In addition, complex ARQ schemes, especially the more advanced Hybrid ARQ schemes, are complicated to implement and require a high degree of optimization to fully take advantage of the increased throughput that is theoretically possible. Often the lack of system optimization, which has become very complex, makes the wireless systems deliver less throughput than the Hybrid ARQ schemes are capable off.

SUMMARY

An improved ARQ method that quickly and automatically adapts to channel quality changes is needed.

An object of the technology described herein is to provide a method, system and programs that overcomes the drawbacks described above.

A sender and a receiver are engaged in wireless communication with each other. The sender is provided with an incoming data stream of a plurality of protocol data units (PDUs).

The sender transmits a plurality of PDUs which are at least partially overlapping with at least two different transmission power levels being used for the transmission of at least two different PDUs.

One example embodiment comprises the steps of:

a)—grouping of PDUs, wherein a number of PDUs from the to the sender incoming data stream are group into a set of PDUs, and each PDUs are given a sequence number (n);

b)—assigning Transmit Power and Code rate to PDUs. wherein each PDU is assigned a transmit power level value ($P_k$) and a code rate value ($C_k$);

c)—storing PDUs, wherein the PDUs are stored in a memory along with their sequence number (n), and the assigned power level value, ($P_k$), and code rate value ($C_k$);

d)—transmitting PDUs, wherein the PDUs of the set of PDUs are simultaneously transmitted from the sender with their respective power level value ($P_k$) and code rate value ($C_k$), e)—receiving PDUs, wherein the transmitted PDUs are received by the receiver, decoded and checked for errors (CRC), and PDUs not considered decodable are recognised as not correctly received;

f)—feedbacking (ARQ), wherein the receiver transmit to the sender an ARQ feedback in form of a ACK or NACK message, wherein the message comprises information on the PDUs which were correctly received or the PDUs which were not correctly received, respectively;

g)—discarding correctly received PDUs from memory, wherein the sender discard from the memory the temporally stored PDUs, which was correctly received, and forming a new set of PDUs comprising the PDUs which were not correctly received and PDUs from the incoming data stream;

h)—repeating steps b) to g), whereby retransmitting the not correctly received PDUs at higher power levels than the previous transmission.

The technology described herein provides a radio channel adaptation that is opportunistic with respect to channel variations. A higher number of PDUs are transmitted when the channel so permits, and a lesser number if the instantaneous channel quality is low. At each transmission instance there will be a very high probability that at least a part of the transmitted PDUs are correctly received, i.e., some information will almost always be transferred. This is in contrast to prior art ARQ schemes (both conventional and Hybrid schemes), wherein, in some cases, no information will be transferred.

One Because of fast channel adaptation in combination with a high probability of some PDUs will be correctly received in every attempt, a less precise channel feedback is needed. In other words, the technology described herein increases robustness against unpredictable channel fluctuations. In additions, this adaptation is performed with relatively low complexity, ensuring a fast and reliable implementation.

A further advantage is backward compatibility to legacy terminals in most communication systems. Base stations and new terminals implement the novel ARQ-scheme, whereas legacy terminals see the coarsest level and decode the same, but with somewhat degraded performance due to the interference caused by underlying (with respect to power level) PDUs.

DETAILED DESCRIPTION

Figure 1A:
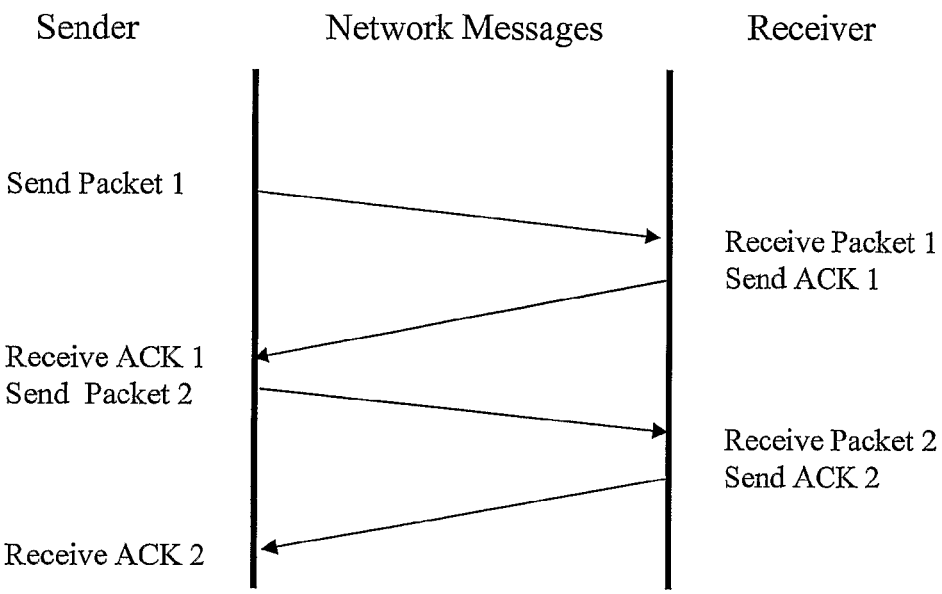
FIGS. 1 *a*) and *b*) are message sequence chart of conventional ARQ schemes.
Figure 1B:
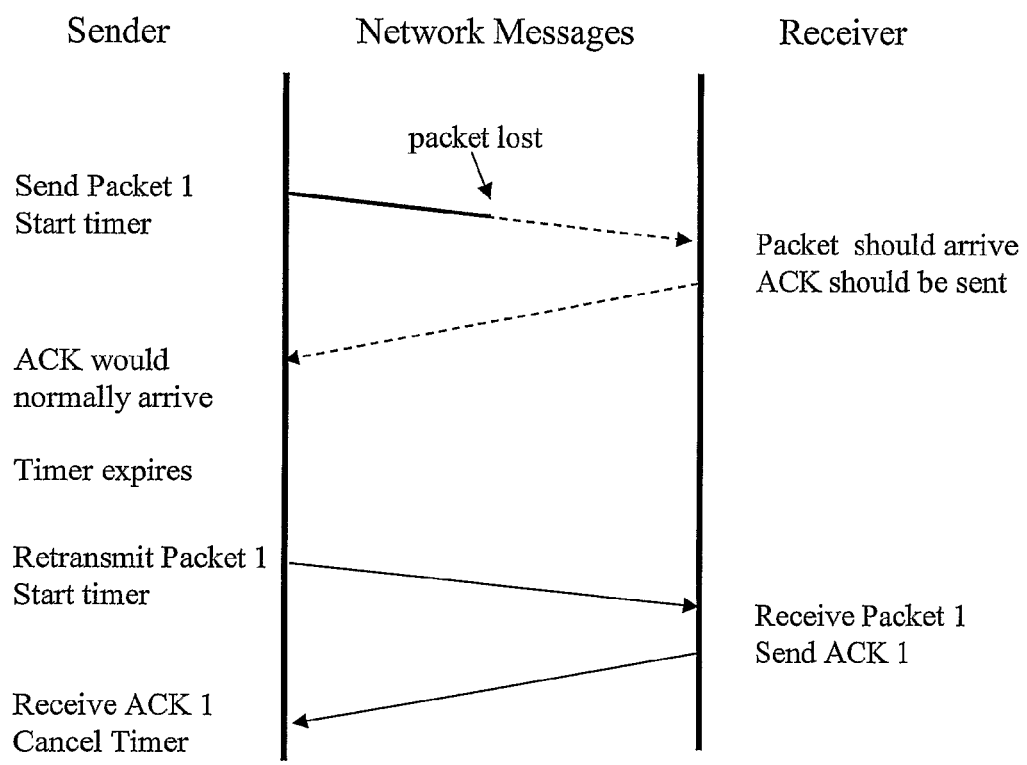

In a typical scenario for using ARQ, two or more entities are engaged in wireless communication with each other. The communication is commonly referred to as being over a radio channel, which for example is a logical channel in a wireless communication system such as UMTS. The entities are capable of both transmitting and receiving radio signals. For the clarity of the description, the entity that is to transmit a payload of data is referred to as the sender, and the entity that is to receive the data is referred to as the receiver, even though in the ARQ processes both entities receives and transmit signals over the channel. As discussed in the background section, fading fluctuation and interference fluctuations caused by traffic variations, may cause the channel quality to change unpredictable. Illustrated in FIG. 2. is the "uncertainty" of the carrier to interference ratio (CIR) as a probability density function in a typical traffic and fading scenario. As can be understood from the figure, an average channel quality may be defined, but the channel quality will quite frequently deviate substantially from that average, and a transmission at one time instance can experience both better and worse channel quality than the average quality. In the same manner, if an instant measure of the channel quality is used as a reference, the probability of that measure not being representative of the channel quality is fairly high. Measures of the channel quality are performed in all wireless systems, for example by measuring BER, and used as a basis for determining transmit power, link adaptation etc. As described above, the known ARQ schemes become inefficient when the channel quality changes unpredictable.

The method provides an ARQ scheme that is well suited to a situation of changing channel quality. According to the method the sender transmits a set of multiple PDUs at essentially the same time multiplexed on different power levels and preferably with fairly low (code) rate for each PDU. Each PDU 205 in the set 210 is given a sequence number n and is assigned an individual code rate $C_n$ and an individual power level $P_n$. The code rate and power levels are chosen so that between one and all transmitted PDUs are decodable by the receiver in presence of noise and interference. The number of decodable PDUs depends on the noise level, indicated at 215, and which powers the PDUs are received with. The PDU with lowest sequence number is preferably assigned the highest power, and the following sequence numbers are assigned with subsequent lower transmit power. If a PDU in the set that has failed the decoding process, a retransmission is ordered through a ACK or NACK procedure. The lost PDU is then given the lowest sequence number for the transmission, hence uses the highest power. Alternatively, or in combination, the PDUs are given different coding, i.e., different data rate.

Various known modulation/multiplexing methods may be used for the simultaneous transmission, e.g. Multi Resolution Modulation (MRM), Direct Sequence-Code Division Multiple Access DS-CDMA or "Turbo-coded" CDMA.

Various known decoding methods may be used, such as Multi User Detection (MUD) schemes including Successive Interference Cancellation (SIC), Parallel Interference Cancellation (PIC), Maximum Likelihood Detection, etc.

Figure 2:
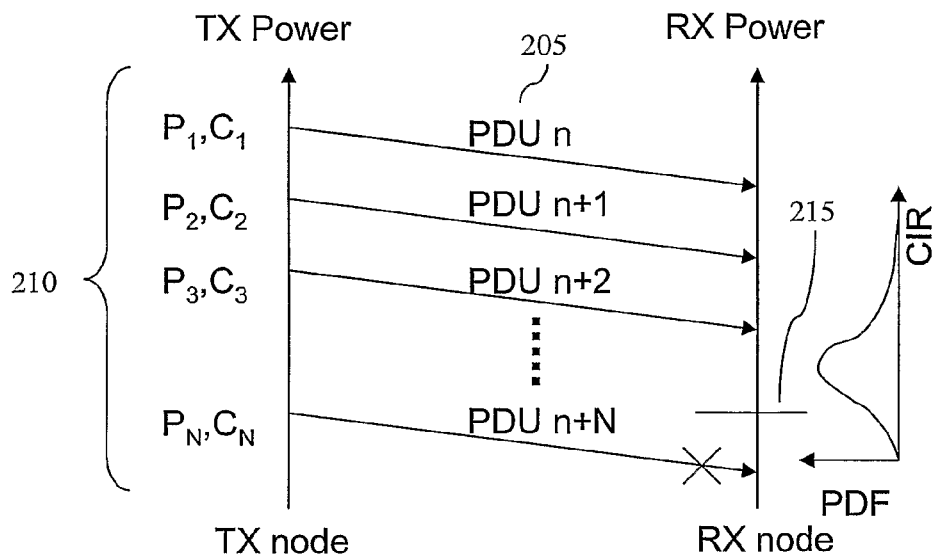
FIG. 2 is a flowchart.

An example embodiment, representing an example basis for an implementation, of the ARQ method will be described with reference to the message sequence charts of FIGS. 2 and 3 and the flowchart of FIG. 4. The method comprises the steps of:

405: Grouping of PDUs.

A number of PDUs from the incoming data stream are group into a set of PDUs. The PDUs are given respective sequence numbers according to n, n+1, n+2, . . . , N+n−1. The number, N, of PDUs in a set is typically given by the capability of multiple transmissions and/or decoding of the used modulation/multiplexing method and decoding method, respectively. N is typically a predetermined value, but can also be a parameter.

410: Assign Transmit Power and Code Rate to PDUs.

Each PDU is assigned a transmit power level value $P_k$ and a code rate value $C_k$, wherein k=1, 2, . . . , N. Preferably the PDU with the lowest sequence number (n) is assigned the highest power level value $P_1$, and the subsequent PDUs are assigned to decreasing power levels, $P_2$, $P_3$, $P_4$, etc. The power level values preferably ranges from a value above the estimated needed transmission power (from corresponding measure of the channel quality), to ensure a high probability for that PDU to be correctly received, to values below the estimated needed transmission power. The PDUs transmitted with the lower transmission powers will have less probability of being correctly received, but with regards to the probability density function of FIG. 2, it is understood that also a PDU transmitted with considerably lower power than the estimated needed transmission power may be successfully received.

415: Storing PDUs.

The PDUs are stored in a memory along with their sequence number, n, and the assigned power level value, $P_k$, and code rate value $C_k$.

420: Transmitting PDUs.

The PDUs (n to N−1) of the set of PDUs are simultaneously transmitted from the sender with their respective power level value, $P_k$, and code rate value $C_k$.

425: Receiving PDUs.

The transmitted PDUs are received by the receiver, decoded and checked for errors (CRC). Typically are a subset of the PDUs correctly received. The rest of the PDUs are probably below the noise floor at the moment of transmission and regarded as lost. Generally the subset of correctly received PDUs comprises subsequent PDUs n, n+1, n+2, . . . , R, wherein R represents the highest sequence number, corresponding to the lowest transmit power, $P_R$, that gave a correctly received PDU.

430: ARQ Feedback.

The receiver transmits an ARQ feedback to the sender in form of an ACK or NACK message. In case of an ACK, the message comprises the sequence numbers of the PDUs in the subset of correctly received PDUs (typically n, n+1, n+2, . . . , R). In case of a NACK, the message comprises the sequence numbers of the transmitted PDUs that were not correctly received, i.e. not in subset (typically R+1, R+2, . . . , N+n−1). Alternatively the ACK or NACK messages comprises a representation of R, indicating that sequence numbers up to R were correctly received, or indicating that sequence numbers after R were incorrectly received, respectively.

435: Discarding Correctly Received PDUs from Memory.

Upon reception of the ACK or NACK message, the sender discard from the memory the temporally stored PDUs, which was correctly received, i.e. the subset n, n+1, n+2, . . . , R. A new set is regrouped wherein the PDUs which were not correctly received (R+1, R+2, . . . , N+n−1) are given the lowest sequence numbers, and hence will be given the highest transmission power level values. The set is then "filled up" with new PDUs from the incoming data stream, R+1, R+2, . . . , N+n−1 units.

440: Repeat Step 410 to 435.

The assigning, transmission and ARQ process is repeated for all PDUs of the incoming data stream.

Depending on the result of a transmission of a set of PDUs, the total power level, the maximum power level $P_1$, the intervals between power levels and the code rate values, can be adjusted between the transmissions of sets.

Figure 3:
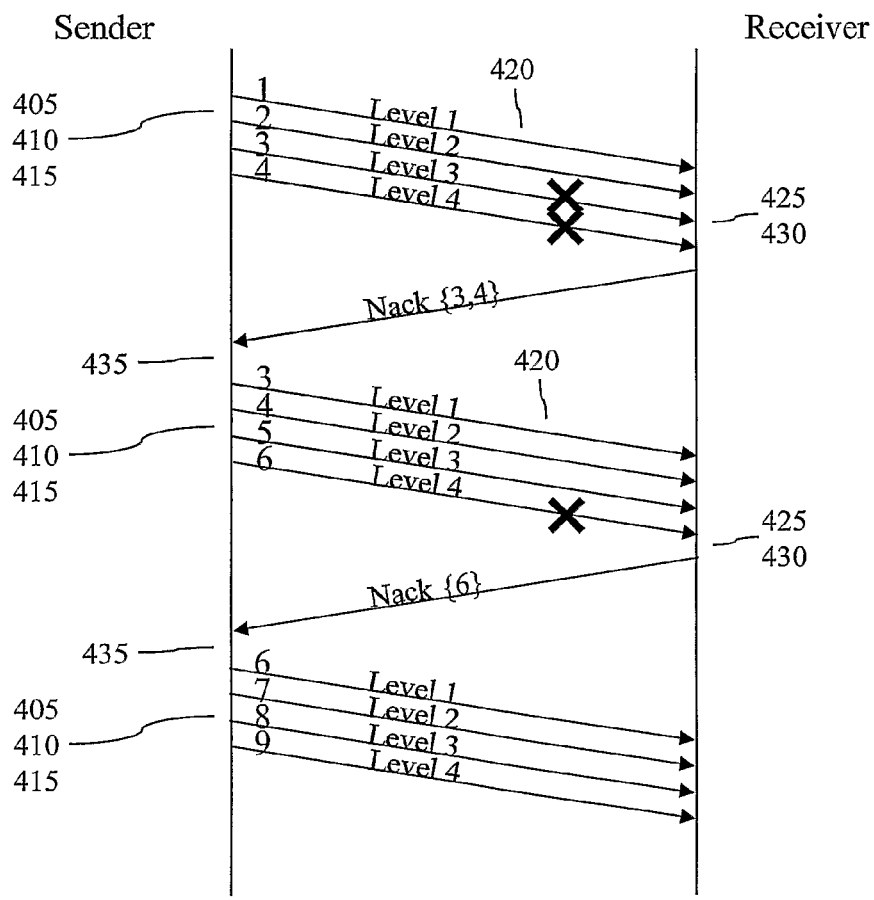
FIG. 3 is a message sequence chart.

Illustrated in the message sequence chart of FIG. 3 is an example of a method with four possible simultaneous transmissions (N=4), i.e. four power levels $P_1$, $P_2$, $P_3$, and $P_4$. The first set will comprise of $PPU_1$, $PDU_2$, $PDU_3$, and $PDU_4$ (step 405), with assigned power levels $P_1$, $P_2$, $P_3$, and $P_4$, and code rates $C_1$, $C_2$, $C_3$, and $C_4$ (step 410). The transmission (step 420) results in that only $PDU_1$, $PDU_2$, are correctly received (step 425). The receiver sends a NACK message informing the sender that $PDU_3$, and $PDU_4$ were lost (step 430). At the sender a new PDU set is formed (step 435) with $PDU_3$, $PDU_4$, $PDU_5$, and $PDU_6$, which will be transmitted with power levels $F_1$, $F_2$, $F_3$, and $F_4$, respectively.

The relation between power levels, code and interference plus noise level relations, depends on modulation and coding scheme as well as the decoder structure. As an illustrative example, one may assume that Shannon limit approaching codes and a successive interference cancellation based receiver are used. Further, for simplicity one may assume that each PDU can be considered as a white noise sequence without any structure. One may further assume that one has decided which rates each level should be used, here denoted $C_k$, where k is in the range 1 to K. Moreover, the PDUs will be decodable at certain SNR levels, or equivalently at certain interference level thresholds. Now, assume that those threshold levels are denoted $I_k$. Then the power levels $P_k$ for each level can be determined as:

$$C_N = \lg_2\left(1 + \frac{P_N}{I_N}\right), C_{N-1} = \lg_2\left(1 + \frac{P_{N-1}}{I_{N-1} + P_N}\right),$$

$$C_k = \lg_2\left(1 + \frac{P_k}{I_k + \sum_{j=k+1}^{N} P_j}\right).$$

Figure 5:
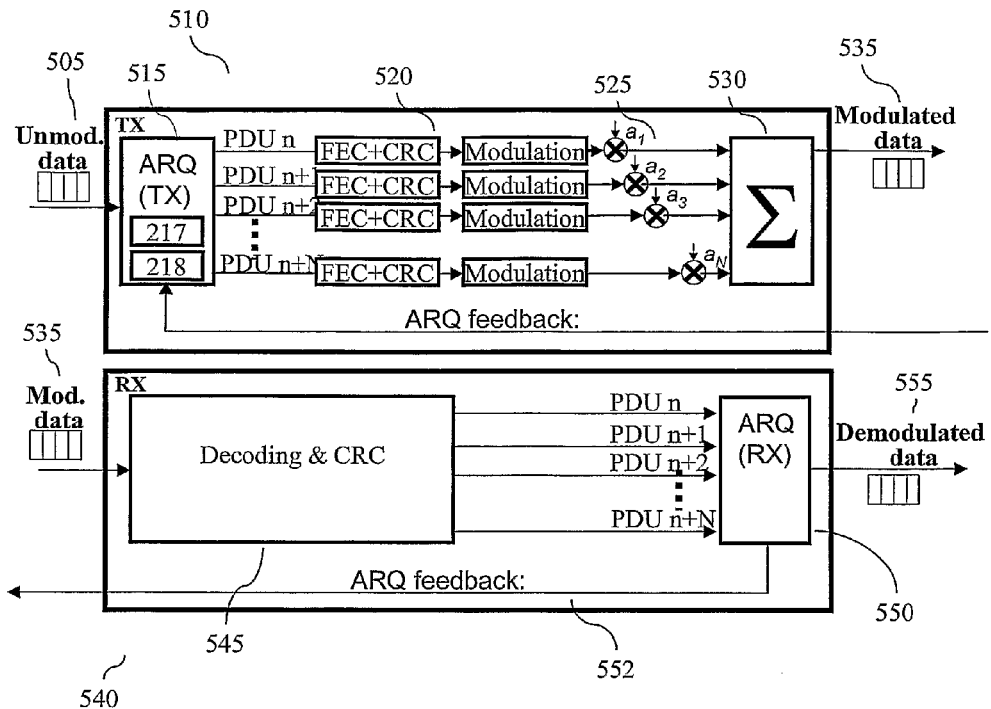
FIG. 5 is a schematic view of an exemplary implementation architecture.

A possible exemplary implementation architecture wherein Multi Resolution Modulation is used to multiplex the different ARQ PDUs in different hierarchies, is shown in FIG. 5. An unmodulated data stream 505 is fed to a transmitter unit 510. In an ARQ TX block 515 the PDUs are group into a set and assigned individual transmit power and/or code rate (steps 405 and 410) followed by a coding and modulation block 520 in which the PDUs are coded with for example FEC+CRC and modulated. The ARQ TX block 515 further comprises a storing module 517, wherein the PDUs are stored temporarily (step 415) while awaiting the ARQ feedback (step 430), and a discarding module 518 (step 435). The signals are mixed and combined by mixers 525 and a combiner 530 and transmitted as modulated data 535 over the air interface (step 420).

On the receiving side, the receiver 540 receives the modulated data (step 425). In a decoding block 545 the individual PDUs are restored and by the CRC functionality it determines which PDUs that are not correctly received. The PDUs are fed to the ARQ RX block 550 that order the ARQ TX 515 to retransmit the incorrect PDUs (step 430) as indicated with ARQ feedback 552. Outputted from the receiver 540 is the demodulated data 555, which should correspond to the unmodulated data 505.

Figure 6:
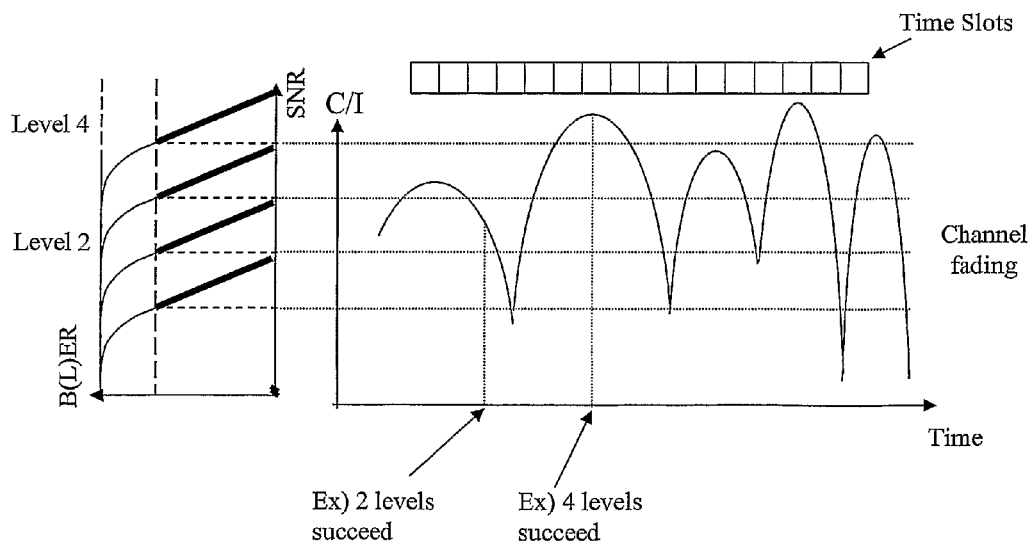
FIG. 6 illustrates the method used on a channel that exhibit time varying fading.

FIG. 6 illustrates the ARQ method under operation in the time domain for a fading channel, where the coherence time is larger than the time slot durations used to send the PDUs. As shown in the figure, the number of PDUs that are correctly received will vary in time due to the variations of the radio channel and interference.

The technology described herein is explained primarily in the context of a flat channel. However, it may also be used over channel that varies e.g. OFDM with frequency selectivity.

In addition, PDUs that are decoded at one time instance can be cancelled from the baseband signals. This residual baseband signal can then be used in combination of new received signals, e.g. by maximum ratio combining.

The proposed hierarchical ARQ scheme may also be used in combination with other Hybrid-ARQ methods, by using different FEC codes for the same PDU depending if it is the first, second, thirds (and so on) time the PDU is sent.

The technology described herein may also be used in conjunction of advanced antenna concepts including, but not limited to beamforming and MIMO based communication, for example. The method can be described as giving a radio channel adaptation that is opportunistic with respect to channel variations—a higher number of PDUs will be transmitted when the channel so permits, and a lesser number if the instantaneous channel quality is low. The method ensures that at each transmission instance there will be a very high probability of that at least a part of the transmitted PDUs are correctly received i.e., some information will almost always be transferred. This is in contrast to prior art ARQ schemes (both conventional and Hybrid schemes), wherein, in some cases, no information will be transferred.

Alternatively, or in combination with the above, the ability of fast channel adaptation provided by the technology described herein, may be utilized in that less precise channel feedback is needed, since the invention increases robustness against unpredictable channel fluctuations. In addition this adaptation is performed with relatively low complexity, ensuring a fast and reliable implementation.

The method offers backward compatibility to legacy terminals in most communication systems. This can be achieved in that base stations and new terminals implements the novel ARQ-scheme, whereas legacy terminals merely see the coarsest power level and decode the same, possibly with somewhat degrade performance due to the interference caused by underlying (with respect to power level) PDUs.

The method may be implemented for example by program products or program module products comprising the software code for performing the steps of the method when executed on a computer. The program products are preferably executed on a plurality of entities within a network. The program may be distributed and loaded from a computer usable medium, such as a floppy disc, a CD, or transmitted over the air, or downloaded from Internet, for example.

While the technology described herein has been described in connection with what is presently considered to be the most practical and preferred embodiments, it is to be understood that the invention is not to be limited to the disclosed embodiments, on the contrary, is intended to cover various modifications and equivalent arrangements within the appended claims.

The invention claimed is:

1. A method of automatic repeat request (ARQ) in data communication between a sender and a receiver engaged in wireless communication with each other, wherein the sender is provided with an incoming data stream of a plurality of protocol data units (PDUs) and the ARQ method uses an acknowledgement message (ACK) and negative acknowledgement message (NACK), the method comprising the steps of:
   a)—grouping of PDUs corresponding to the sender incoming data stream into a set of multiple PDUs and assigning each of the multiple PDUs a corresponding sequence number;
   b)—assigning to each of the multiple PDUs a respective transmit power level value and a respective code rate value;
   c)—storing each of the multiple PDUs in a memory along with its corresponding sequence number and its assigned transmit power level value and code rate value;
   d)—transmitting the set of multiple PDUs simultaneously from the sender with the assigned transmit power level value and code rate value of each of the multiple PDUs;
   e)—the receiver receiving, decoding, and error checking the transmitted set of multiple PDUs, where received PDUs not considered decodeable are recognized as not correctly received;
   f)—the receiver transmits to the sender ARQ feedback in the form of an ACK or NACK message, wherein the ACK or NACK message comprises information on PDUs which were correctly received or PDUs which were not correctly received;
   g)—the sender discarding from the memory the stored PDUs which were correctly received and forming a new set of PDUs comprising the PDUs which were not correctly received,
   wherein the PDUs which were not correctly received in a first transmission are retransmitted in a subsequent transmission at higher respective power level values than that used in the first transmission, and
   wherein the new set of PDUs also includes new PDUs from the incoming data stream,
   wherein the PDUs in the new set of PDUs are assigned descending power levels with regards to their sequence number so that a PDU in the new set of PDUs with a lowest sequence number is given a highest power level, and
   wherein the PDUs which were not correctly received have lower sequence numbers than the new PDUs.

2. The ARQ method according to claim 1, wherein at least one of the power level values used for transmitting at least one PDU in the new set of PDUs is below an estimated noise floor.

3. A computer program product stored in a memory of a computer within each of a sender and a receiver, comprising software code, which when executed on a computer, implements the following method of automatic repeat request (ARQ) in data communication between a sender and a receiver engaged in wireless communication with each other, wherein the sender is provided with an incoming data stream of a plurality of protocol data units (PDUs) and the ARQ method uses an acknowledgement message (ACK) and negative acknowledgement message (NACK), the method comprising the steps of:

a)—group of PDUs corresponding the sender incoming a set of multiple PDUs and assigning each of the multiple PDUs a corresponding sequence number;

b)—assigning to each of the multiple PDUs a respective transmit rower level value and a respective code rate value;

c)—storing each the multi PDUs in a memory along with its corresponding sequence number and its assigned transmit power level value and code rate value;

d)—transmitting the set of multiple PDUs simultaneously from the sender with the assigned transmit power level value and code rate value of each of the multiple PDUs;

e)—the receiver receiving, decoding, checking set of multiple PDUs, where received PDUs not considered decodeable are recognized as not correctly received;

f)—the receiver transmits to the sender ARQ feedback in the form of an ACK or NACK message, wherein the ACK or NACK message comprises information on PDUs which were correctly received or PDUs which were not correctly received;

g)—the sender discarding from the memory the stored PDUs which were correctly received and forming a new set of PDUs comprising the PDUs which were not correctly received, wherein the PDUs which were not correctly received in a first transmission are retransmitted in a subsequent transmission at higher respective power level values than that used in the first transmission, and wherein the new set of PDUs also includes new PDUs from the incoming data stream, wherein the PDUs in the new set of PDUs are assigned descending power levels with regards to their sequence number so that a PDU in the new set of PDUs with a lowest sequence number is given a highest power level, and wherein the PDUs which were not correctly received have lower sequence numbers than the new PDUs.

4. A computer program product stored on a computer-usable medium, comprising a readable program which when executed on a computer, causes a computer processor within each of a sender and a receiver, to execute the following method of automatic repeat request (ARQ) in data communication between a sender and a receiver engaged in wireless communication with each other, wherein the sender is provided with an incoming data stream of a plurality of protocol data units (PDUs) and the ARQ method uses an acknowledgement message (ACK) and negative acknowledgement message (NACK), the method comprising the steps of:

a)—grouping of PDUs corresponding to the sender incoming data stream into a set of multiple PDUs and assigning each of the multiple PDUs a corresponding sequence number;

b)—assigning to each of the multiple PDUs a respective transmit power level value and a respective code rate value;

c)—storing each of the multiple PDUs in a along corresponding sequence number and its assigned transmit power level value and code rate value;

d)—transmitting the set of multiple PDUs simultaneously from the sender with the assigned transmit power level value and code rate value of each of the multiple PDUs;

e)—the receiver receiving, decoding, and error checking the transmitted set of multiple PDUs, where received PDUs not considered decodeable are recognized as not correctly received;

f)—the receiver transmits to the sender ARQ feedback in the form of an ACK or NACK message, wherein the ACK or NACK message comprises information on PDUs which were correctly received or PDUs which were not correctly received;

g)—the sender discarding from the memory the stored PDUs which were correctly received and forming, a new set of PDUs comprising the PDUs which were not correctly received, wherein the PDUs which were not correctly received in a first transmission are retransmitted in a subsequent transmission at higher respective power level values than that used in the first transmission, and wherein the new set of PDUs also includes new PDUs from the incoming data stream, wherein the PDUs in the new set of PDUs are assigned descending power levels with regards to their sequence number so that a PDU in the new set of PDUs with a lowest sequence umber is given a highest power level, and wherein the PDUs which were not correctly received have lower sequence numbers than the new PDUs.

5. A system of at least one sender and at least one receiver configured to be engaged in mutual wireless data communication, the system using automatic repeat request (ARQ), an acknowledgement message (ACK), and a negative acknowledgement message (NACK) in the data communication, wherein the sender is provided with an incoming data stream of a plurality of protocol data units (PDUs), the sender comprising:

grouping means for grouping PDUs so that a number of PDUs corresponding to the sender incoming data stream are grouped into a set of multiple PDUs, and each of the multiple PDUs is given a sequence number, n, and assigning transmit power and code rate to each of the multiple PDUs so that each of the multiple PDUs is assigned a transmit power level value and a code rate value, wherein said grouping means is arranged to receive an ARQ feedback;

storing means arranged to be accessible from said grouping means and to store each of the multiple PDUs along with its corresponding sequence number, assigned transmit power level value, and code rate value;

transmitting means for transmitting the set of multiple PDUs so that each of the multiple PDUs is essentially simultaneously transmitted from the sender with its corresponding power level value and code rate value;

discarding means, arranged to be accessible from said grouping means, for discarding PDUs from memory which were correctly received, and forming a new set of PDUs comprising the PDUs which were not correctly received, and the receiver comprising:

means for receiving, decoding, and checking the transmitted set of multiple PDUs for errors, and recognizing one or more of those PDUs which are not considered decodeable as not correctly received;

feedback means for feeding back to the sender an ACK or NACK message, wherein the ACK or NACK message comprises information on the PDUs which were correctly received or the PDUs which were not correctly received, wherein the PDUs which were not correctly received in a first transmission are in a subsequent transmission retransmitted at higher respective power level values than used in the first transmission, wherein the new set of PDUs also includes new PDUs from the incoming data stream and the PDUs in the new set of PDUs are assigned descending power levels with regards to their corresponding sequence number so that a PDU in the new set of PDUs with a lowest sequence number is given a highest power level value, and wherein the PDUs which were not correctly received have lower sequence numbers than the PDUs in the new set of PDUs.

6. A radio communication device for data communication by transmitting a plurality of protocol data units (PDUs) with the use of an automatic repeat request (ARQ) protocol, an acknowledgement message (ACK), and a negative acknowledgement message (NACK), the radio communication device comprising:

a transmitter unit comprising:

grouping circuitry arranged to group PDUs in an incoming data stream into a set of multiple PDUs and to assign each of the multiple PDUs in the set a sequence number, a transmit power value, and a code rate value, and to receive an ARQ feedback signal;

a memory, accessible from said grouping circuitry, arranged to store each of the multiple PDUs in the set along with its corresponding sequence number, power level value, and code rate value, a transmitter for simultaneously transmitting the set of multiple PDUs with the corresponding power level value and code rate value of each of the multiple PDUs;

discarding circuitry, accessible from said grouping circuitry, arranged to discard from memory stored PDUs which were correctly received and to form a new set of PDUs comprising the PDUs which were not correctly received along with new PDUs from the incoming data stream, wherein the PDUs which are not correctly received in a first transmission are in a subsequent transmission retransmitted at higher respective power level values than used in the first transmission, wherein the PDUs in the new set of PDUs are assigned descending power levels with regards to their sequence number so that a PDU in the new set of PDUs with a lowest sequence number is given a highest power level value, and wherein the PDUs which were not correctly received have lower sequence numbers than the new PDUs.

7. A radio communication device according to claim 6, further comprising a receiving unit comprising:

circuitry for receiving, decoding, and checking the transmitted set of multiple PDUs for errors and for recognizing one or more of those PDUs which are not considered decodeable as not correctly received, and for feeding back to the sender an ACK or NACK message, wherein the ACK or NACK message comprises information on the PDUs which were correctly received or the PDUs which were not correctly received.

8. A radio communication device according to claim 6, wherein the radio communication device is a mobile terminal for use in a cellular radio communication system.

9. A radio communication device according to claim 6, wherein the radio communication device is a radio base station for use in a cellular radio communication system.

* * * * *

UNITED STATES PATENT AND TRADEMARK OFFICE
CERTIFICATE OF CORRECTION

PATENT NO. : 7,724,640 B2
APPLICATION NO. : 10/584859
DATED : May 25, 2010
INVENTOR(S) : Larsson Page 1 of 2

Figure 4:
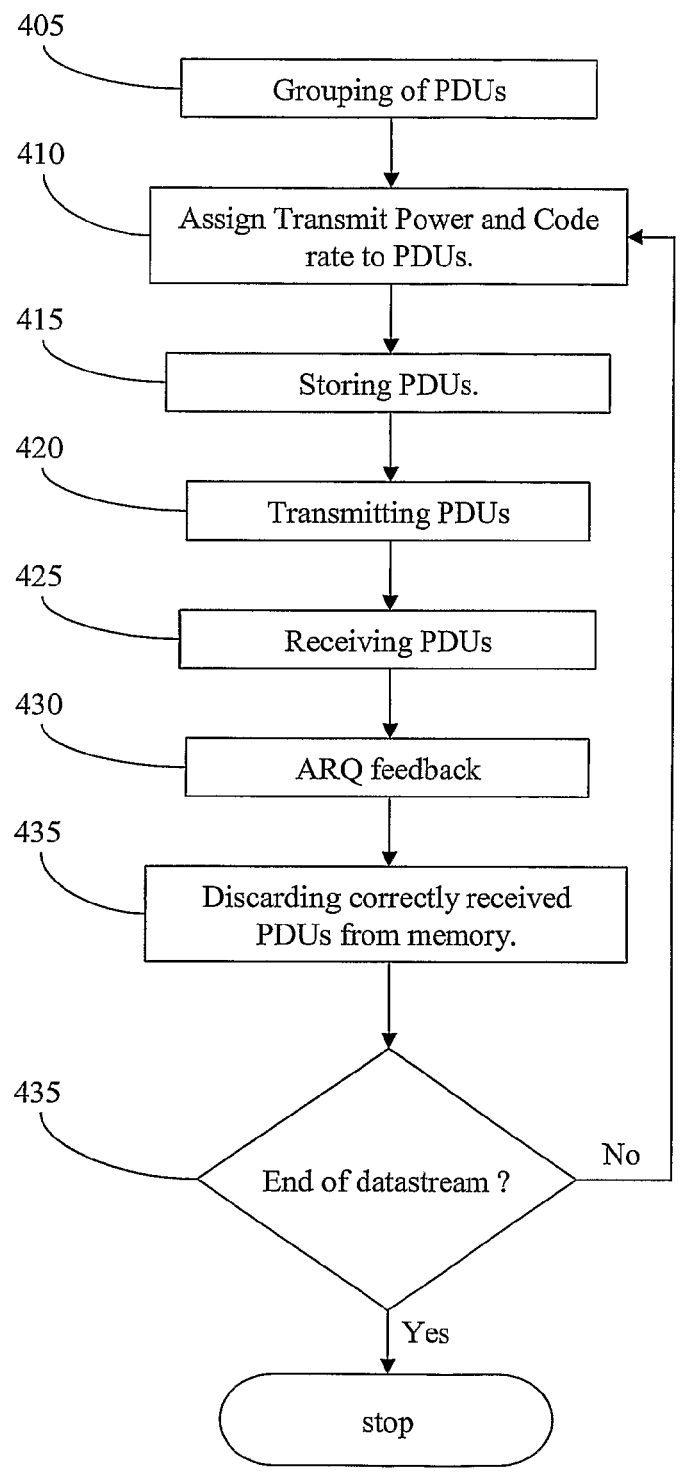
FIG. 4 is a message sequence chart.

It is certified that error appears in the above-identified patent and that said Letters Patent is hereby corrected as shown below:

In Fig. 4, Sheet 3 of 4, delete "  " and insert --  --, therefor.

In Column 2, Line 34, delete "suffers" and insert -- suffer --, therefor.

In Column 3, Line 21, delete "($C_k$)," and insert -- ($C_k$); --, therefor.

In Column 3, Line 55, delete "Because" and insert -- because --, therefor.

In Column 3, Line 60, delete "additions," and insert -- addition, --, therefor.

In Column 4, Line 11, after "chart;" delete "and".

In Column 6, Line 35, delete "$F_1$, $F_2$, $F_3$, and $F_4$," and insert -- $P_1$, $P_2$, $P_3$, and $P_4$, --, therefor.

In Column 7, Lines 37-47, delete "The method can be..............will be transferred." and insert the same as a new Paragraph in Line 38.

In Column 7, Line 44, delete "received" and insert -- received, --, therefor.

In Column 9, Line 5, in Claim 3, delete "group" and insert -- grouping --, therefor.

In Column 9, Line 5, in Claim 3, after "corresponding", insert -- to --.

In Column 9, Line 5, in Claim 3, after "incoming", insert -- data stream into --.

In Column 9, Line 9, in Claim 3, delete "rower" and insert -- power --, therefor.

In Column 9, Line 11, in Claim 3, after "each", insert -- of --.

Signed and Sealed this

Nineteenth Day of October, 2010

David J. Kappos
*Director of the United States Patent and Trademark Office*

CERTIFICATE OF CORRECTION (continued)
U.S. Pat. No. 7,724,640 B2

In Column 9, Line 11, in Claim 3, delete "multi" and insert -- multiple --, therefor.

In Column 9, Line 17, in Claim 3, delete "decoding, checking set" and insert -- decoding, and error checking the transmitted set --, therefor.

In Column 9, Lines 62-63, in Claim 4, delete "a along corresponding" and insert -- a memory along with its corresponding --, therefor.

In Column 10, Line 11, in Claim 4, delete "forming," and insert -- forming --, therefor.

In Column 10, Line 23, in Claim 4, delete "umber" and insert -- number --, therefor.

In Column 11, Line 23, in Claim 6, delete "set a" and insert -- set of a --, therefor.